United States Patent

Pezzlo et al.

[11] 3,803,567
[45] Apr. 9, 1974

[54] RESOLVER TO PULSE WIDTH CONVERTER

[75] Inventors: John Pezzlo, Framingham, Mass.;
Chong-Loh Tsiang, Sterling Heights, Mich.

[73] Assignee: Chandler Evans Inc., West Hartford, Conn.

[22] Filed: Feb. 23, 1973

[21] Appl. No.: 334,994

[52] U.S. Cl. ............................. 340/198, 340/206
[51] Int. Cl. ..................... G08c 19/22, G08c 19/38
[58] Field of Search ............ 340/198; 318/605, 654, 318/661

[56] References Cited
UNITED STATES PATENTS

| 2,980,900 | 4/1961 | Rabin | 340/198 |
| 3,156,907 | 11/1964 | Lanning | 340/198 |
| 3,634,838 | 1/1972 | Granqvist | 340/198 |

*Primary Examiner*—Thomas B. Habecker

[57] ABSTRACT

The signal induced in the rotor windings of a non-contacting transducer is converted into a pulse width modulated voltage commensurate with rotor angular position. Signal conversion is accomplished by operating a resolver in a phase shift mode and comparing the phase of the voltage induced in the rotor winding with a reference signal commensurate with the excitation voltage applied to one of the resolver stator windings.

5 Claims, 1 Drawing Figure

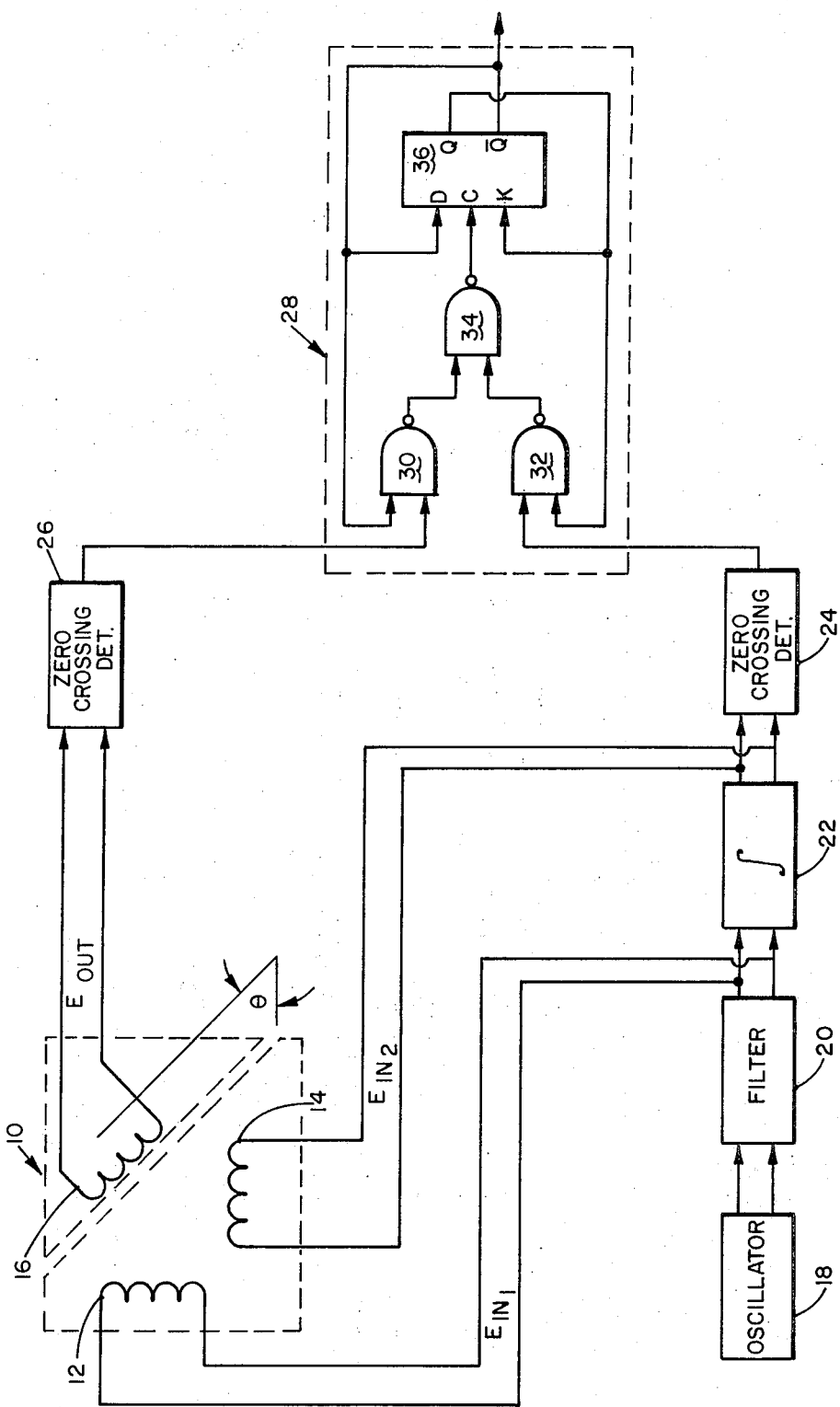

RESOLVER TO PULSE WIDTH CONVERTER

BACKGROUND OF THE INVENTION

1. Field of the Invention

The present invention relates to the measurement of the angular position of rotatable members. More specifically, this invention is directed to non-contacting methods and apparatus for accurately determining the angular position of an actuator. Accordingly, the general objects of the present invention are to provide novel and improved methods and apparatus of such character.

2. Description of the Prior Art

Numerous control applications require the transducing of a mechanical position into an electrical signal; the electrical signal thereafter being employed for indication and/or feedback purposes in the control system. Numerous devices exist in the prior art for accomplishing this signal generation function. However, the majority of prior art transducers, which are typically potentiometer type devices, require physical contact between the rotating member that is having its angular position monitored and a stationary member. The design limitations imposed by and the numerous other disadvantages incident to the use of such "contacting" transducers, such as contact wear and contact "bounce" due to vibration, are well known and will not be discussed herein.

Non-contacting devices and techniques for accurately measuring angular position have also been proposed and in some cases implemented. Prior art non-contacting devices have typically operated in a proportional voltage mode wherein the magnitude of an output voltage varied in accordance with the shaft position of interest. These prior "proportional" sensors, however, have been lacking in accuracy and, perhaps more importantly, do not provide an output signal in suitable form for use by associated control circuitry. Thus, by way of example, most aerospace control systems which monitor and control the angular position of an actuator output shaft are pulse width responsive. Thus, the prior art devices which operate in the normal proportional voltage mode require a.c. to d.c. converters and voltage magnitude to pulse width converters. The requirement for such additional circuitry increases system cost, weight and size while simultaneously having a deleterious effect on system reliability.

SUMMARY OF THE INVENTION

The present invention overcomes the above briefly discussed and other disadvantages and deficiencies of the prior art by providing a novel non-contacting method for accurately measuring the angular position of an actuator. Apparatus in accordance with the invention includes a resolver having its rotor mechanically coupled to the actuator output shaft. In accordance with the invention the resolver is operated in a phase shift mode whereby the alternating current output voltage is constant and the phase of the output signal with respect to a reference varies in direct proportion to the shaft position of interest.

In a preferred embodiment of the invention the resolver will include one rotor winding and two stator windings. The first stator winding is fed with a sine wave voltage of constant frequency and amplitude and the other stator winding is fed with an alternating current signal of the same frequency and amplitude and having a cosine relationship to the signal applied to the first stator winding. Thus, the two stator windings are excited separately, one by a cosine function and the other by a sine function, and an output signal will be induced in the rotor winding which varies in phase from one of the excitation signals by an amount directly proportional to input or actuator shaft position. Through the use of novel phase comparison circuitry, an output signal is generated by comparing the voltage induced in the rotor with the selected excitation signal; the resulting output signal having a pulse width which is porportional to resolver angle.

BRIEF DESCRIPTION OF THE DRAWING

The present invention may be better understood and its numerous objects and advantages will become apparent to those skilled in the art by reference to the accompanying drawing which is an electrical schematic diagram of a preferred embodiment of the invention.

DESCRIPTION OF THE PREFERRED EMBODIMENT

With reference now to the drawing, a resolver is indicated schematically and generally at 10. Resolver 10 is a standard commercially available device employing a pair of electrically transversely oriented stator windings 12 and 14 and a rotor or output winding 16. The resolver rotor is, by any suitable means, mechanically coupled to the output shaft of an actuator; the angular position of the actuator output shaft being the parameter of interest. As will be obvious to those skilled in the art, and as will be explained in greater detail below, the voltage to be induced in rotor winding 16 will be a function of the angle between the rotor and stator windings 12 and 14. This angle will hereinafter be referred to as the rotor phase angle $\phi$.

A square wave generator 18, which will typically include a crystal controlled oscillator, provides an output square wave of constant frequency. The square wave voltage provided by oscillator 18 is applied to a filter 20. Filter 20, which may be either a low pass or band pass filter, converts the square wave into a sinusoidal voltage of constant frequency and constant average amplitude. This sine wave voltage is applied to rotor winding 12 and will be referred to hereinafter as:

$$E_{in} = A \sin \mu t$$

This sinusoidal voltage from filter 20 is also applied to an integrator circuit 22 which may, for example, comprise an "active" RC circuit. In the manner well known in the art, integrator 22 will generate a voltage having a wave form which is the cosine of the filter 20 output voltage and having a magnitude equal to the magnitude of the applied voltage. This cosine wave form is employed as the excitation voltage for stator winding 14 and will be referred to hereinafter as:

$$E_{in} = A \cos \mu t$$

As will be apparent to those skilled in the art, the voltage induced in rotor winding 16 will be related to the excitation voltages applied to the stator windings in accordance with the following equation:

1. $E_{out} = A \sin \mu t \cos \phi + A \cos \mu t \sin \phi$

Applying the law of cosines to the above equation, it may be shown that:

2. $E_{out} = A \cos(\mu t + \phi)$

Equation (2) thus proves that the phase shift of the signal induced in rotor winding 16 with respect to the excitation voltage applied to stator winding 14 is a function of the rotor angle $\phi$.

The excitation voltage for stator winding 14, as provided at the output of integrator 22, is applied to a zero crossing detector 24. Zero crossing detector 24 is a logic circuit of the type well known in the art and may, for example, comprise a National Semiconductor Type LM 111. Similarly, the rotor winding 16 is connected to a zero crossing detector 26 which may be identical to zero crossing detector 24. Zero crossing detectors 24 and 26 provide square wave output signals commensurate with the applied voltages; these output square waves being shifted in phase as indicated by equation (2) above.

The output signals provided by zero crossing detectors 24 and 26 are applied to a phase comparison circuit indicated generally at 28. Phase comparison circuit 28 includes NAND gates 30, 32 and 34 and a JK or toggling flip-flop circuit 36. The input NAND gates 30 and 32 "pass" the trailing edges of the applied square wave signals. In the manner which will be described below and which will be apparent to those skilled in the art, the Q output of flip-flop 36 will be negative going square wave pulses having a width commensurate with the period of time between the trailing edge of the square wave signal derived from the voltage induced in rotor winding 16 and the trailing edge of the square wave derived from the excitation voltage applied to stator winding 14. Similarly, the Q output of flip-flop 36 will be a series of positive going pulses having a duration equal to the Q output pulses. The Q output of flip-flop 36 is fed back as the second input to NAND gate 32, for transient suppression purposes, and also to the K input of the bistable circuit. Similarly, the Q output of flip-flop 36 is applied as the second input to NAND gate 30, also in the interest of transient suppression, and as the J input to the bistable circuit. The Q output of flip-flop 36 will normally be at its "high" level and the bistable circuit will be switched in response to the trailing edge of each output pulse provided by zero crossing detector 26 and will be reset in response to the trailing edge of each output pulse provided by zero crossing detector 24. Control over the toggling of bistable circuit 36 is exercised directly by NAND gate 34. Gate 34 permits the clock input of circuit 36 to "look" at the trailing edge of the input signals to gates 30 and 32 and to respond accordingly. This results in a set-reset condition with the interval between the toggling of circuit 36 being commensurate with the phase shift between the input signals applied to gates 30 and 32 and thus being commensurate with the resolver angle.

While a preferred embodiment has been shown and described, various modifications and substitutions may be made thereto without departing from the spirit and scope of the invention. Accordingly, it is to be understood that this invention has been described by way of illustration and not limitation.

What is claimed is:

1. Apparatus for providing an indication of the angular position of a movable member comprising:
   resolver means, said resolver means including a rotor winding coupled to the movable member and at least a pair of stator windings inductively coupled to the rotor winding, said stator windings of said pair being electrically transversely oriented;
   means for generating and applying to a first of said stator windings a first periodically varying excitation voltage;
   means for generating and applying to a second of said stator windings a second periodically varying excitation voltage, said second excitation voltage having a known phase relationship to said first excitation voltage; and
   means connected to one of said stator windings and to said rotor winding for comparing the phase of the voltage induced in said rotor winding with the excitation voltage applied to said one stator winding and for generating a signal commensurate with phase difference, said signal commensurate with phase difference being indicative of rotor angular position.

2. The apparatus of claim 1 wherein said means for generating said first excitation voltage provides a sine wave and wherein said means for generating said second excitation voltage comprises:
   means connected to said sine wave voltage generator and responsive to the output signal provided thereby for generating a voltage having a waveform which is the cosine of said first excitation voltage and which has a magnitude equal to the magnitude of said first excitation voltage.

3. The apparatus of claim 1 wherein said comparing means comprises:
   first zero crossing detector means connected to receive the voltage induced in said rotor winding;
   second zero crossing detector means to receive the excitation voltage applied to said one of said stator windings; and
   means connected to the outputs of said zero crossing detector means for generating a pulse width modulated output signal.

4. The apparatus of claim 2 wherein said comparing means comprises:
   first zero crossing detector means connected to receive the voltage induced in said rotor winding;
   second zero crossing detector means to receive the excitation voltage applied to said one of said stator windings; and
   means connected to the outputs of said zero crossing detector means for generating a pulse width modulated output signal.

5. The apparatus of claim 4 wherein said means for generating said second excitation voltage comprises:
   integrator means connected to the output of said sine wave voltage generating means.

* * * * *